March 12, 1968  H. K. GLEASMAN  3,372,608
THREE-SPEED HUB GEARING FOR VELOCIPEDES
Filed June 13, 1966  2 Sheets-Sheet 1

WITNESS:
Esther M. Stockton

INVENTOR.
Hollis K. Gleasman
BY
W. S. Thompson
ATTORNEY

March 12, 1968 H. K. GLEASMAN 3,372,608
THREE-SPEED HUB GEARING FOR VELOCIPEDES
Filed June 13, 1966 2 Sheets-Sheet 2

WITNESS:
Esther M. Stockton

INVENTOR.
Hollis K. Gleasman
BY
W. S. Thompson
ATTORNEY

United States Patent Office 3,372,608
Patented Mar. 12, 1968

3,372,608
THREE-SPEED HUB GEARING FOR
VELOCIPEDES
Hollis K. Gleasman, Elmira, N.Y., assignor to The Bendix Corporation, a corporation of Delaware
Filed June 13, 1966, Ser. No. 556,961
10 Claims. (Cl. 74—750)

The present invention relates to a semi-automatic three-speed hub and coaster brake for velocipedes and the like and, more particularly, to that type in which the shift from one gear ratio to the other is brought about by slight backward rotation of the driving member.

It is an object of the present invention to provide a semi-automatic three-speed hub and brake which is efficient and reliable in operation while being simple and economical.

It is an object of the present invention to provide a three-speed hub and brake for velocipedes and the like which has no exterior control.

It is an object to provide a three-speed semi-automatic hub for velocipedes and the like which does not need adjustment during the use of the vehicle.

It is an object of the present invention to provide a three-speed hub and brake for velocipedes and the like which has no exterior controls to be damaged during the use of the vehicle.

It is an object of the present invention to provide a three-speed hub and brake for velocipedes and the like which is resistant to damage from rough handling and which has great durability.

It is an object of the present invention to provide a three-speed hub and brake for velocipedes and the like in which compression forces between driving clutch members and the hub are eliminated.

It is a further object of the present invention to minimize axial compression forces between and among the driving clutch members.

It is a further object of the present invention to provide a three-speed hub and brake for velocipedes and the like in which driving and coasting frictional forces and frictional losses are kept to a minimum.

It is a still further object of the present invention to provide a three-speed hub and brake for velocipedes and the like which has an axial dimension approximately the same as that of present two-speed semi-automatic hub and brakes for velocipedes and the like and which has no functional portion extending beyond the axle suspension device.

It is a still further object of the present invention to provide a semi-automatic hub and brake for velocipedes and the like in which there is an overdrive gear ratio, an underdrive gear ratio, a direct drive gear ratio and a brake contained within the hub.

It is a still further object of the present invention to provide a novel three-speed hub and brake for velocipedes and the like in which driving forces have substantially no axial components.

Additional objects and advantages of the present invention will be apparent from the following description taken in conjunction with the accompanying figures illustrating an embodiment of the present invention in which.

Figure 1:
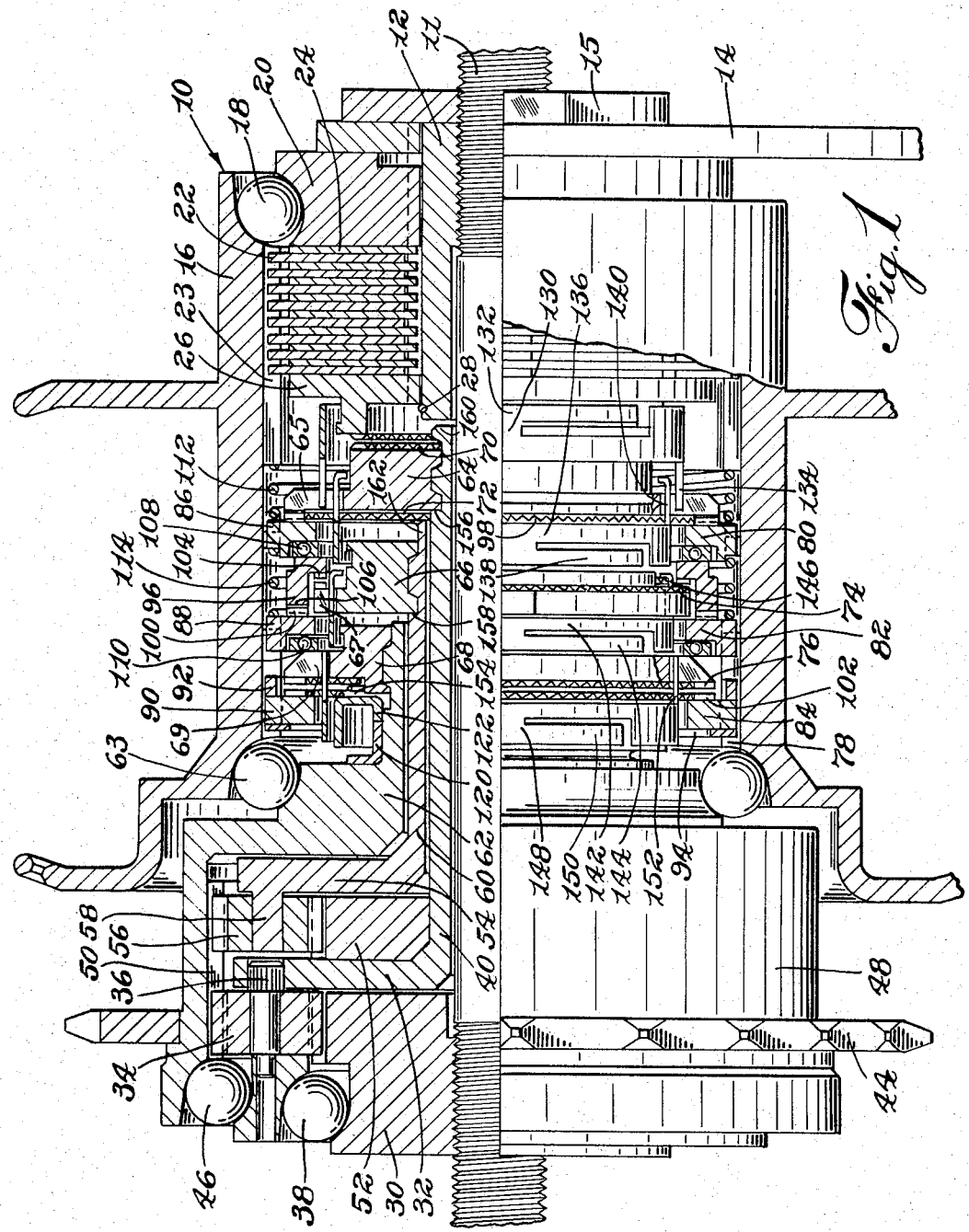
FIGURE 1 is a side elevation, partly broken away and in section.

Turning now to FIGURE 1, numeral 10 indicates generally a three-speed hub and brake for velocipedes and the like having a stationary axle 11 adapted to be mounted in the rear fork of a bicycle or the like. A brake anchor sleeve 12 is threaded on the axle 11 and held for rotation by an anchor arm 14 non-rotatably mounted thereon, retained by clamping nut 15 and prevented from rotation by a clip (not shown) adapted to be attached to the frame member of the vehicle in the conventional manner. A hub 16 is rotatably mounted on the anchor sleeve 12 by means of bearings 18 seated on a bearing cone 20 fixedly mounted on the anchor sleeve. Brake discs 22 and 24 are splined alternately to the hub 16 and anchor sleeve 12 and are arranged to be pressed against the bearing cone 20 by means of a brake actuating member 26 splined on the anchor sleeve and loosely retained thereon by a lock ring 28. Those skilled in the art will immediately appreciate that instead of using a disc pack ring, a shoe brake could be employed within the hub. A typical shoe brake design which could be employed within the hub is that shown in U.S. patent application Ser. No. 453,717, filed on May 5, 1965, in the name of Edwin Elliott Hood and assigned to the common assignee of the present application.

A first sun gear member 30 is threaded on the axle 11. A first planet carrier member 32 has planet gears 34 mounted on pintles 36 in the planet carrier 32. The first planet gear 34 engages the first sun gear 30 and is supported thereon by bearings 38. A first threaded shaft member 40 is formed integrally with the planet carrier 32 or fixedly connected thereto. A sprocket member 44 is supported on bearings 46 for rotation about the first planet carrier 32. Sprocket member 44 is splined integrally with or connected to driving member 48 which has an orbit or ring gear portion 50 formed on its inner surface. A second sun gear 52 is fixedly connected for rotation with the first threaded shaft 40. A second planet carrier member 54 having second planet gears 56 mounted on pintles 58 interconnects the orbit gear or ring gear 50 to the second sun gear 52. Formed integrally with or fixedly connected for rotation with the planet carrier 54 is a second threaded shaft 60. A third threaded shaft 62 is formed integrally with or connected to the driving member 48. Bearings 64 support the hub 16 about the third threaded shaft 62. It can readily be appreciated that when the sprocket member 44 rotates the driving member 48, that the three threaded shafts 40, 60 and 62 will all rotate together. It can be further easily seen that threaded shaft 62 will rotate the same number of revolutions per minute as the sprocket 44 and that the second threaded shaft 60 will rotate a greater number of revolutions per minute than the sprocket 44 and that the first threaded shaft 40 will rotate at a lesser number of revolutions per minute than the sprocket 44. This specific arrangement of three speeds may be varied by changing the gear ratios between planet gears and sun gears and by using an orbit gear having two ring gear portions instead of the one as shown in the present embodiment.

Figure 2:
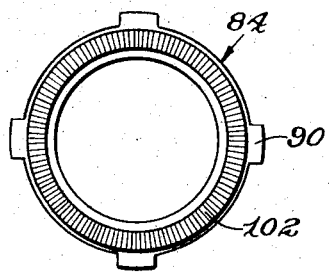
FIGURE 2 is an axial view of a driving ring member.
Figure 3:
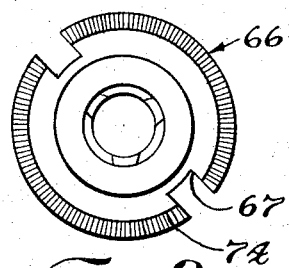
FIGURE 3 is an axial view of a driving clutch member.
Figure 4:
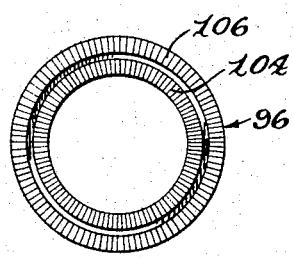
FIGURE 4 is an axial view of an intermediate driving ring member.

First, second, and third driving clutch members 64, 66 and 68 are threadedly received on their respective threaded shafts 40, 60 and 62. The second driving clutch member 66 is shown in FIGURE 3, the first and third driving clutch members 64 and 68 are substantially similar. Dentil teeth 70 and 72 are formed on both transverse ends of the first driving clutch member. Dentil teeth 74 are formed on a transverse surface of a second driving clutch member distant from the sprocket member 44. The third driving clutch member 68 has dentil teeth 76 formed on the transverse end thereof nearest the sprocket member 44. A hub 16 has a plurality of splines 78 which may be internally or externally formed. First, second and third driving ring members 80, 82 and 84 have splines 86, 88 and 90, respectively, which are adapted to engage the splines 78 formed in the hub 16. The third driving ring member 84, shown in FIGURE 2, is axially fixed within the hub 16 by first and second annular lock rings 92 and 94. An intermediate clutch ring or driving clutch member 96 is disposed axially intermediate of the first and second driving clutch ring members 80 and 82. The first, second and third driving ring members 80, 82 and 84 have dentils 98, 100 and 102, respectively, formed on the transverse end thereof distant from the sprocket members 44. The intermediate clutch ring member 96, shown in FIGURE 4, has inner and outer annular transverse surfaces which have dentils 104 and 106 formed thereon respectively which are adapted to engage the second driving ring member dentils 100 and the second driving clutch member dentils 74 respectively.

Figure 5:
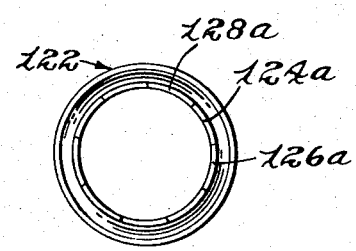
FIGURE 5 is an axial view of an indexing member.
Figure 6:
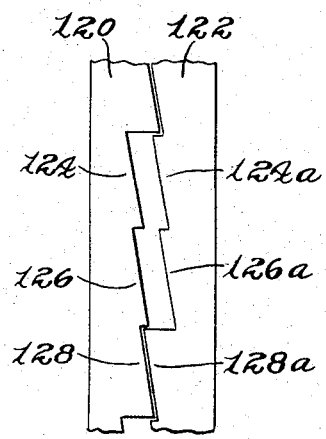
FIGURE 6 is a transverse view of the indexing members in their thickest position.
Figure 7:
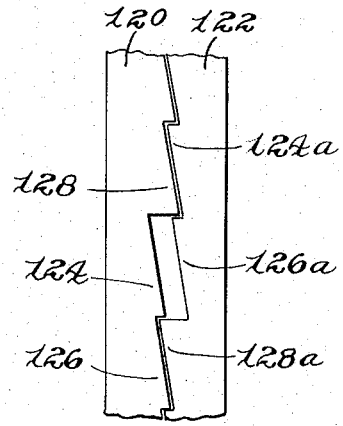
FIGURE 7 is a transverse view of the indexing members in their intermediate position.
Figure 8:
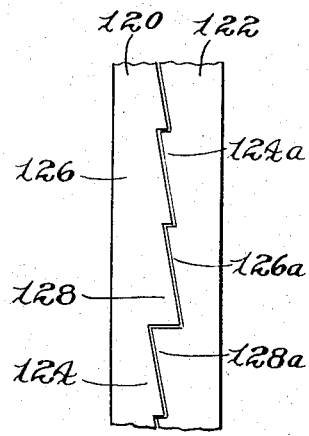
FIGURE 8 is a transverse view of the indexing members in their thinnest position.

A first thrust bearing member 108 is disposed axially between the first driving ring member 80 and the intermediate driving ring member 96. A second annular thrust bearing member 110 is disposed axially intermediate of the second driving ring member and the third driving clutch member 68. A first coil spring member 112 is compressively confined between the hub brake splines 23 and the first driving ring member 80. A second coil spring member 114 is compressively confined between the first driving ring member 80 and the second driving ring member 82. The first and second coil spring members 112 and 114 serve to bias the first and second driving ring members 80 and 82 respectively toward the sprocket member 44. A first annular indexing member 120 is fixedly connected for rotation with the third threaded shaft 62 and a second annular indexing member 122, shown in FIGURE 5, is disposed intermediate of the third threaded shaft 62 and the third driving ring member 84. The second annular indexing member 122 is free to rotate relative to the first annular indexing member 120. As best shown in FIGURES 6, 7 and 8, the first and second annular indexing members 120 and 122 form a variable thickness wedge having a three-step axial dimension. This variable axial dimension is achieved by forming complementary dentil teeth on adjacent surfaces of the annular indexing members 120 and 122. Each annular indexing member 120 and 122 has respectively first, second and third dentil teeth 124, 126, 128 and 124a, 126a and 128a formed therein. There ought to be at least two of such triple height teeth on each annular indexing member 120 and 122. There may, however, be more than two.

A first retarder sleeve member 130 has a sleeve portion 132 which frictionally engages a brake actuator member 26 and a finger portion 134 which fits into a slot 65 in the first driving clutch member 64. A second retarder sleeve member 136 has a frictional portion 138 which frictionally engages second driving clutch member 66 and a finger portion 140 which fits into slot 65 in the first driving clutch member 64. A third retarder sleeve member 142 has a sleeve portion 144 which frictionally engages the third driving clutch member and a finger portion 146 which fits through slot 67 in the second driving clutch member 66. A fourth retarder sleeve member 148 has a frictional sleeve 150 which frictionally engages the second annular indexing member 122 and a finger portion 152 which is fitted into slot 69 in the third driving clutch member 68. Those skilled in the art will readily appreciate that the frictional retarder members could have been of the frictional ring and coupling member combination as shown in U.S. Patent 2,982,384, issued to E. E. Hood and assigned to the assignee of the present application. A conical spring member 154 is disposed between the third driving clutch member and the second annular indexing member to provide a bias force to keep the annular indexing members into contactive engagement. The first and second driving clutch members 64 and 66 have heel portions 156 and 158 formed on the sprocket side thereof respectively to limit the axial translation of the driving clutch members 64 and 66 toward the sprocket member 44. Similarly, the threaded shaft members 40 and 60 have radially-outwardly-extending portions 160 and 162 respectively to limit the axial translation of the driving clutch members in the direction of the brake actuating member 26. FIGURE 1 shows the hub being driven by the first driving clutch member 64. In that position the second driving clutch member 66 has its dentils 74 disengaged from the intermediate driving ring member dentils 104. Although dentils 100 of the second driving ring member are engaged with dentils 106 of the intermediate driving ring member 96, dentils 76 and 102 of the third driving clutch member 68 and the third driving ring member 84 are disengaged. The annular indexing members are at their greatest axial dimension as shown in FIGURE 6.

When it is desired to shift gears, backward rotation of the sprocket member 44 a predetermined amount will cause the annular indexing members 120 and 122 to go to their thinnest axial dimension as shown in FIGURE 8 and the hub will be driven through the third driving ring member 84, which, in the present embodiment, is direct drive. This result is accomplished as follows. Upon backward rotation of the sprocket member, the fourth retarder ring 148 will resist rotation of the second annular indexing member 122 and cause it to index relative to the first annular indexing member 120 which is carried by the third shaft member 62. When forward pedalling is resumed, the third annular retarder member 142 will cause the third driving clutch member 68 to advance toward the third driving ring member 84 and their respective dentil teeth 76 and 102 will engage and will drive the hub 16 through direct drive.

When it is desired to shift to the overdrive or second driving ring member, the sprocket member 44 is rotated backward a predetermined amount where again the second annular indexing member 122 indexes relative to the first annular indexing member 120 as described above and moves into the intermediate axial width position shown in FIGURE 7, blocking the third driving clutch member 68 from contact with the fixed third driving ring member 84. The spring members 112 and 114, although operative to bias the second driving ring member 82 toward the sprocket member 44, are opposed by the second thrust bearing member 110 so that the dentils 100 and 105 of the second driving ring member 82 and intermediate driving clutch member 96, respectively, are engaged. Spring member 112 serves to bias the first thrust bearing member 108 through the driving ring member 80 such that dentils 84 and 104 of the second driving clutch members 66 and intermediate driving ring member 96 are engaged. The hub 16 is then being driven by the second driving clutch member 66 in the overdrive mode.

At any time when it is desired to brake or slow down the rotation of the hub member 16, the sprocket member 44 is rotated backward in an amount greater than necessary to index the annular indexing members 120 and 122. The retarder member 130 ensures the axial translation of the first driving clutch member 64 in the direction of the brake actuator member 26. Axial force on the brake actuator member 26 causes the brake discs 22 and 24 to be pressed together, thereby braking the hub 16.

It can readily be appreciated that the present invention accomplishes its proposed objects. There are no external members to be damaged by rough handling, nor are there any external members which need adjustment. The shifting and braking is controlled entirely through the operation of the rotational direction of the sprocket member 44. It can readily be appreciated that the gear ratios may be changed and that the gear position assumed after braking may be adjusted by the well known methods currently understood in the art. Because the present invention employs a dentil tooth arrangement for propelling the various driving ring members, there are virtually no frictional losses involved in torque transmission. However, it must be readily understood that friction clutch surfaces rather than dentil tooth surfaces could be employed. The slotted driving clutch members 64, 66 and 68 enable the retarder members to be fitted therethrough, thereby resulting in a considerable axial space saving. In addition, the use of the intermediate driving clutch ring 96 disposed radially outwardly of the second driving clutch member 66 saves additional axial space within the hub 16 and enables the entire device to be kept within reasonable axial dimensions comparable to that of the present day semi-automatic two speed hub and brakes. Still further hub driving forces have substantially no axial components tending to wear or damage operating parts of the hub and brakes.

Although certain structures have been shown and described in detail, it will be understood that changes may be made in the design and arrangement of parts without departing from the spirit of the invention.

I claim:

1. In a semi-automatic three-speed hub and brake for velocipedes and the like the combination of:
   an axle member;
   a first sun gear member fixedly connected to the axle member;
   a first planet carrier member having first planet gear members engaging said first sun gear member;
   a first threaded shaft member rotatable with the first planet carrier member;
   a second sun gear member fixedly connected to the first threaded shaft member;
   a second planet carrier member having second planet gear members engaging said second sun gear member;
   a second threaded shaft member rotatable with the second planet carrier member;
   a sprocket member having a ring gear and a threaded shaft formed integrally therewith and mounted for forward and backward rotation relative to said axis;
   bearing means supporting the hub for rotation about the axle member;
   first, second and third driving clutch members threadedly received on the first, second and third shaft members;
   axially-extending splines formed in the hub;
   first, second and third driving ring members adapted to engage said hub axial splines, said driving ring members having dentils formed on the transverse end thereof distant from the sprocket member;
   an intermediate clutch member having first and second dentils formed on transverse outer and inner annular surfaces thereof facing the sprocket member adapted to interconnect the second driving ring member and the second driving clutch member;
   brake means interconnecting the hub and axle for stopping the rotation of the hub relative to the axle;
   said first driving clutch member having dentils formed on the transverse end thereof distant from the sprocket member adapted to engage the brake means;
   a first coil spring member biasing the first driving ring member away from the brake means;
   a second coil spring member biasing the second driving ring member away from the first driving ring member;
   first and second annular indexing members having complementary triple height dentil teeth adapted to form a selectively variable triple thickness wedge, the first indexing member rotatable with the third threaded shaft member and the second indexing member supported between the third threaded shaft member and the third driving ring member for rotation relative thereto;
   first and second retarder sleeve members having axially-extending finger members connected for rotation with said first clutch member, said first retarder sleeve frictionlly engaging said brake means and said second retarder sleeve frictionally engaging said second clutch member;
   a third retarder sleeve member having an axially-extending finger portion connected for rotation with said second clutch member and frictionally engaging said third clutch member;
   a fourth retarder sleeve member having an axially-extending finger portion connected for rotation with said third clutch member and frictionally engaging said second annular indexing member;
   said retarder members operative to resist the rotation of the respective members frictionally engaged thereby; and
   said indexing members operative in response to backward rotation of the sprocket member in combination with the retarder members to selectively position the driving clutch members and the first and second driving ring members relative to each for driving the hub at three different gear ratios and for braking the hub.

2. The device described in claim 1 including further:
   first and second thrust bearing members disposed within the hub on the sprocket side of the second drive ring member and on the brake means side of the intermediate drive ring member respectively.

3. The device described in claim 1 including further:
   first and second annular lock members for fixedly locating the third driving ring member within the hub.

4. The device described in claim 1 wherein:
   the brake means comprises an anchor sleeve member threaded on said axle;
   an anchor arm for preventing the rotation of the anchor sleeve;
   brake disc members alternately splined to the anchor member and the hub;
   a brake actuator member splined to the anchor sleeve member for axial movement relative thereto; and
   said first retarder sleeve frictionally engages said brake actuator member.

5. In a semi-automatic three-speed hub and brake for velocipedes and the like the combination of:
   an axle member;
   a plurality of epicyclic gearing means having first and second threaded shaft members rotatable therewith;
   a sprocket means having a ring gear and a third threaded shaft rotatable therewith, said ring gear driving said epicyclic gearing means;
   bearing means supporting the hub for rotation about the axle member;
   first, second and third driving clutch members threadedly received on the first, second and third shaft members;
   axially-extending splines formed in the hub;
   first, second, and third driving ring members adapted to engage said hub axial splines, said driving ring members having dentils formed on the transverse end thereof distant from the sprocket member;
   an intermediate clutch member having dentiled transverse inner and outer annular surfaces facing the sprocket member adapted to interconnect the second driving ring member and the second driving clutch member;
   first and second spring means biasing the first and second driving ring members toward the sprocket means;
   first and second annular indexing members having complementary triple height dentil teeth adapted to form a selectively variable thickness wedge, the first annular indexing member connected for rotation with the sprocket member and the second annular indexing member disposed radially inwardly of the third driving clutch member for rotation relative thereto;

first and second retarder means connected to the first driving clutch member for resisting rotation of said first driving clutch member relative to the axle means and said second driving clutch means respectively;

a third retarder means connected to the second clutch member for resisting rotation of said second clutch member relative to said third clutch member;

a fourth retarder means connected to said third clutch member for resisting rotation of said third clutch member relative to said second annular indexing member;

said indexing member and retarder means upon backward rotation of the sprocket means operative to selectively position the driving clutch members and the first and second driving ring members relative to each other for driving the hub at three different gear ratios; and brake means interconnecting the hub and axle for stopping the rotation of the hub relative to the axle.

6. The device described in claim 5 including further:
first and second thrust bearing means disposed within the hub to prevent the frictional interconnection of the second and first driving ring members and of the second and third drive ring members.

7. The device described in claim 5 including further:
annular lock means for fixedly locating the third driving ring member within the hub.

8. In a semi-automatic three-speed hub and brake for velocipedes and the like the combination of:
an axle means;
sprocket means rotatable relative to said axle;
gear means rotatable by said sprocket means;
first, second, and third threaded shaft means rotatable at different speeds by said sprocket and gear means;
first, second and third clutch members threaded on their respective shaft means;
first, second and third hub driving means adapted to be engaged by their respective clutch members;
annular indexing means having a three-step selectively-variable axial extent disposed within the hub;
retarder means for causing the axial movement of the clutch members on their respective screwshaft means;
spring means for biasing said first and second hub driving means relative to their respective clutch members;
said indexing means and said retarder means operative to selectively position said driving clutch members and said first and second hub driving relative to each other for driving the hub at three different gear ratios; and
brake means interconnecting the hub and axle for stopping the rotation of the hub relative to the axle.

9. The device described in claim 8 wherein:
said first and second driving clutch members having shoulder portions formed thereon to limit the axial travel of said driving clutch members.

10. The device described in claim 8 wherein:
said second hub driving means comprises an annular outer drive ring member splined to the hub having dentils formed on one transverse end thereof and an annular intermediate drive ring member having first and second dentils formed thereon for interconnecting said annular outer drive ring and said second driving clutch member.

References Cited
UNITED STATES PATENTS
2,159,465   5/1939   Williams.
2,854,108   9/1958   Douglas.

FOREIGN PATENTS
13,728   6/1913   Great Britain.
567,340   2/1945   Great Britain.

DONLEY J. STOCKING, *Primary Examiner.*

T. R. HAMPSHIRE, *Assistant Examiner.*